Figure 1:
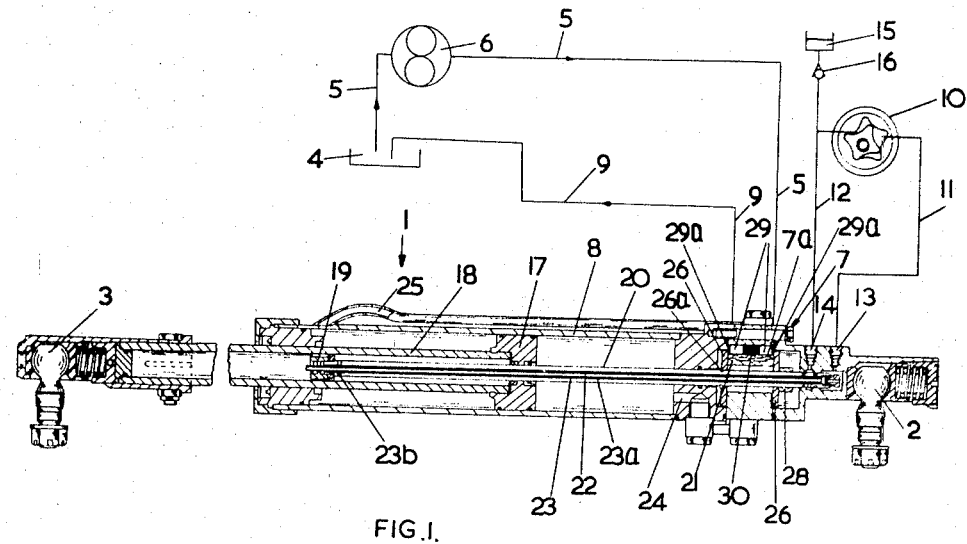

United States Patent
Jenvey

[15] 3,698,188
[45] Oct. 17, 1972

[54] POWER-ASSISTED STEERING MECHANISMS FOR MOTOR VEHICLES

[72] Inventor: Leslie Richard Jenvey, Reading, England

[73] Assignee: Adwest Engineering Limited, Reading, Berkshire, England

[22] Filed: Dec. 18, 1970

[21] Appl. No.: 99,460

[52] U.S. Cl. ................ 60/52 S, 180/79.2 R, 91/460
[51] Int. Cl. .......................................... F15b 15/18
[58] Field of Search ....... 60/52 S; 180/79.2 R; 91/460

[56] References Cited

UNITED STATES PATENTS

| | | | |
|---|---|---|---|
| 3,528,521 | 9/1970 | Ellis | 60/52 S |
| 3,553,966 | 1/1971 | Liebert | 60/52 S |
| 3,159,084 | 12/1964 | Zeigler | 60/52 S |
| 3,271,954 | 9/1966 | Marsee et al. | 60/52 S |
| 3,242,824 | 3/1966 | Jablonsky et al. | 60/52 S |
| 3,370,602 | 2/1968 | Nelson | 60/52 S |
| 3,406,703 | 10/1968 | Gordon | 60/52 S |
| 3,564,848 | 2/1971 | Baatrud | 60/52 S |

*Primary Examiner*—Edgar W. Geoghegan
*Attorney*—Larson, Taylor and Hinds

[57] ABSTRACT

Power-assisted steering mechanism for a motor vehicle comprising a double-acting power-assist piston and cylinder means, a valve having a member movable to connect one side or the other of the power-assist piston and cylinder means with a source of fluid under pressure, and control means for controlling the movement of the movable valve member, the control means comprising a closed hydrostatic circuit which includes at least one positive displacement pump motor adapted for actuation by a manual steering control.

7 Claims, 2 Drawing Figures

3,698,188

POWER-ASSISTED STEERING MECHANISMS FOR MOTOR VEHICLES

This invention relates to power-assisted steering mechanisms for motor vehicles.

In particular the invention is concerned with hydrostatic steering mechanisms having power-assistance. Hydrostatic steering systems are known but such systems, and particularly those provided with power-assistance, suffer from the disadvantages that they have a limited flow output per revolution of the steering wheel or like steering control and that the steering lacks "feel" due to the fact that there is, in the known systems with power-assistance, no set relationship between the angular position of the steering wheel or like steering control and the position of the piston of the conventional double-acting piston and cylinder power-assistance means.

The present invention has as its object to provide improved hydrostatic steering means.

Accordingly the present invention provides power-assisted steering mechanism for a motor vehicle, the mechanism comprising double-acting power-assist piston and cylinder means, a first port whereby the interior of the power-assist cylinder can be placed in communication with a source of fluid under pressure to move the power-assist piston in one direction, a second port whereby the interior of the power-assist cylinder can be placed in communication with a source of fluid under pressure to move the power-assist piston in the opposite direction, a valve having a member movable to connect either one of said ports with a said source of fluid under pressure, and control means for controlling the movement of the movable valve member, the control means comprising a closed hydrostatic circuit which includes at least one positive displacement pump motor adapted for actuation by a manual steering control.

Preferably said control means further comprises double-acting control piston and cylinder means connected in said hydrostatic circuit and adapted to actuate the movable valve member. The valve may comprise a spool or shuttle valve (hereinafter termed "spool valve") the movable spool of which is clamped between washers mounted on the piston rod of the control piston.

The power-assist piston may have a hollow piston rod connected therewith, which hollow piston rod comprises the cylinder of the double-acting control piston and cylinder means.

The piston rod of the control piston may be hollow and may have a hollow tube mounted concentrically therein so as to define therewith an annular passage, the interior of the hollow tube communicating the interior of the control cylinder on one side of the control piston with one side of said positive displacement pump motor and said annular passage communicating the interior of the control cylinder on the other side of the control piston with the other side of said positive displacement pump motor.

The movable valve member may have a central neutral position and spring means may be provided for biassing the movable valve member towards its neutral position. Alternatively, or in addition, the movable valve member may have a plurality of centralizing pistons associated therewith, the arrangement being such that when the movable valve member is moved out of its central neutral position fluid under pressure passing to the power-assist cylinder will act on said centralizing pistons and will bias the movable valve member towards its neutral position with a force which increases with increase in pressure of the fluid under pressure. Thus, for example, said centralizing pistons may comprise at least one opposed pair of centralizing pistons having a spring therebetween which biasses the movable valve member towards its neutral position even when no fluid pressure is acting on the centralizing pistons.

The source of fluid under pressure may comprise a pump adapted to be driven by the engine of a motor vehicle to which the mechanism is fitted.

Figure 2:
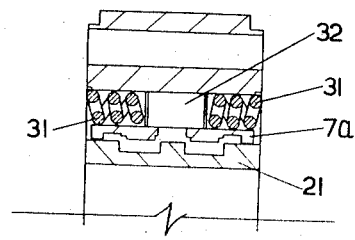

One specific embodiment of a power-assisted steering mechanism according to the present invention will now be described, by way of example, with reference to the accompanying drawings in which FIG. 1 is a cross-sectional elevation of hydraulic power-assist means and spool-valve and which also shows diagrammatically the hydraulic and hydrostatic circuits associated therewith, and FIG. 2 is a fragmentary cross-section showing a modification of the spool valve.

Referring now to FIG. 1 of the accompanying drawing it will be seen that the steering mechanism illustrated therein comprises double-acting power-assist piston and cylinder means generally designated 1, intended to be connected at one end by a ball joint 2 to a fixed part of the chasis or body of a vehicle and intended to be connected at the other end by a ball joint 3 and suitable linkage means (not shown) to the steerable road wheels of the vehicle for providing assistance in steering the steerable road wheels in the requisite direction. Hydraulic fluid is supplied to the unit 1 from a reservoir 4 along conduit 5, via a pump 6 adapted to be driven by the engine (not shown) of the motor vehicle under the control of a control spool valve generally designated 7.

The valve 7 is arranged to supply fluid to one end or the other of the cylinder 8 of the power-assist piston and cylinder means 1, fluid from the opposite end of the cylinder 8 being returned to the reservoir 4 along conduit 9. The control valve 7 is controlled by the steering wheel (not shown) of the motor vehicle by a positive displacement pump motor 10 connected in a simple hydrostatic circuit comprising two conduits 11 and 12. The steering wheel is mechanically coupled to the rotor of the pump motor 10, for example, by a shortened control column (not shown). The two conduits 11, 12 are each connected at one end to opposite sides of the pump motor and at their other ends to ports 13, 14 respectively. The conduits 11, 12 with pump motor 10 and control piston and cylinder means to be described, form a closed hydrostatic circuit. Any loss of fluid in the hydrostatic circuit is replaced from reservoir 15 through a non-return valve 16, the fluid in reservoir 15 being under pressure, e.g., from a source of compressed air (not shown). The power-assist piston and cylinder means 1 comprises a piston 17 having a piston rod 18 and slidable in the cylinder 8. The piston rod 18 is hollow and has slidable therein a control piston 19, to which is connected a hollow piston rod 20 extending in the opposite direction to the piston rod 18 constituting the cylinder for the control piston 19. The movable spool 21 of the control valve 7 is connected to the piston rod 20 of control piston 19 for movement therewith by clamping it between washers 26 one of which is located by circlip 26a and the other of which has clamping pressure applied thereto by screw-ring 28 threaded onto a threaded end portion of piston rod 20.

The hollow piston rod 20 has a hollow tube 23 mounted concentrically therein so as to define therewith an annular passage 23a one end of which communicates with said port 14 and the other end of which communicates with the interior of hollow piston rod 18 on one side of piston 19 by way of radial bores 23b. The interior 22 of tube 23 communicates at one end with said port 13 and at its other end with the interior of hollow piston rod 18 on the opposite side of piston 19.

Flow of fluid to the opposite ends of the double-acting power-assist cylinder 8 is through passages 24, 25 and is controlled by the position of the movable spool 21 of the control valve 7. The movable spool 21 of valve 7 has a central neutral position towards which it is biassed either by a spring and hydraulic reaction or by spring reaction alone. When the spool 21 is moved in one direction by actuation of pump motor 10 and consequent movement of control piston 19 to which spool 21 is secured, one of the passages 24, 25 will be placed in communication with conduit 5 and the other passage 25, 24 with the conduit 9 so that fluid under pressure from engine driven pump 6 will act on one side of power-assist piston 17 to move this piston 17 in appropriate direction. When the spool 21 is moved in the opposite direction the reverse will be the case to move power-assist piston 17 in the opposite direction. A number, e.g. six to ten, of small centralizing pistons 29 arranged in opposed pairs and separated by springs 30 (one set only being shown) are associated with movable spool 21 of valve 7 and butt about half of their diameters against the valve housing as shown at 29a and about half against washers 26. The spool 21 of the valve 7 is approximately one-eighth inch longer than the cooperating part 7a of valve 7. Thus the movable spool 21 can move approximately one-sixteenth inch in either direction and any such movement will result in corresponding deflection of one piston 29 of each pair. In the center position of movable spool 21, engine driven pump 6 is in communication with the reservoir 4. When the spool is moved by operation of control piston 19, one side of power-assist cylinder 8 will be placed in communication with engine-driven pump 6 while the other side of cylinder 8 will be placed in communication with reservoir 4. Accordingly pressure will build-up on one side or the other of power-assist piston 17, dependant upon the direction of movement of valve spool 21, to move power-assist piston 17 in appropriate direction. The fluid under pressure from engine driven pump 6 passes between the opposed pairs of centralizing pistons 29 on its way to the power-assist cylinder 8 with the result that as the fluid pressure rises so this pressure will act on centralizing pistons 29 and the effort required to maintain the valve spool 21 in displaced (valve open) position will increase with the rise in fluid pressure. Furthermore, movement of power-assist piston 17 results in expulsion of hydrostatic fluid from the control cylinder constituted by hollow piston rod 18. The expelled fluid acts on pump motor 10 and so ensures a definite positive relationship between the angular disposition of the vehicle steering wheel and the position of power-assist piston 17 within its cylinder 8. Thus, for example, if the steering wheel is turned through 180° then the power-assist piston 17 will be displaced to a corresponding extent each and every time.

In the modification shown in FIG. 2 the centralizing pistons 29 and springs 30 have been replaced by a series of springs 31 arranged in opposed pairs on either side of pistons 32 (again only one set being shown). Thus in this arrangement the movable valve spool 21 is biassed towards its central position by spring reaction only.

In the illustrated embodiment the control piston and cylinder means is co-axial with the power-assist piston and cylinder means. It is to be understood, however, that other arrangements are possible such, for example as mounting the control piston and cylinder means in tandum with the power-assist piston within the power-assist cylinder.

What we claim is:

1. Power-assisted steering mechanism for a motor vehicle, the mechanism comprising double-acting power-assist piston and cylinder means adapted to be connected to the steerable road wheels of a motor vehicle to impart steering thereto, a first port whereby the interior of the power-assist cylinder can be placed in communication with a source of fluid under pressure to move the power-assist piston in one direction, a second port whereby the interior of the power-assist cylinder can be placed in communication with a source of fluid under pressure to move the power-assist piston in the opposite direction, a valve having a member movable to connect either one of said ports with a said source of fluid under pressure, double-acting control piston and cylinder means, means operatively connecting the control piston with the movable valve member, and a reversible positive displacement pump motor which is adapted for actuation by a manual steering control and which is connected with said control piston and cylinder means in a closed hydrostatic circuit whereby one side of the positive displacement pump motor is connected with one side of the double-acting control piston and cylinder means and the other side of the displacement pump motor is connected with the other side of the double-acting control piston and cylinder means.

2. Power-assisted steering mechanism according to claim 1, wherein said valve is a spool valve and the movable member thereof is a movable spool, the control piston having a piston rod connected therewith and the movable spool being clamped between washers mounted on the piston rod of the control piston.

3. Power-assisted steering mechanism according to claim 1 comprising a hollow piston rod connected with the power-assist piston, the control piston being slidable within the hollow piston rod of the power-assist piston which thereby forms the control cylinder.

4. Power-assisted steering mechanism according to claim 3 comprising a hollow piston rod connected to the control piston and a hollow tube mounted concentrically within the control piston rod so as to define therewith an annular passage, the interior of the hollow tube communicating the interior of the control cylinder on one side of the control piston with one side of said positive displacement pump motor and said annular passage communicating the interior of the control cylinder on the other side of the control piston with the other side of said positive displacement pump motor.

5. Power-assisted steering mechanism according to claim 1, wherein the movable valve member has a central neutral position, spring means being provided for biassing the movable valve member towards its neutral position.

6. Power-assisted steering mechanism according to claim 1, comprising a plurality of centralizing pistons associated with the movable valve member, said centralizing pistons being located in the pressure fluid path to the power-assist cylinder whereby when the movable valve member is moved out of a central neutral position, the fluid under pressure passing to the power-assist cylinder will act on said centralizing pistons to bias the movable valve member towards its neutral position with a force which increases with increase in pressure of the fluid under pressure.

7. Power-assisted steering mechanism according to claim 6, comprising at least one opposed pair of centralizing pistons and a spring mounted between the opposed pair of centralizing pistons and acting on bias the movable valve member towards a said central neutral position.

* * * * *